(12) United States Patent
Yoshimaru et al.

(10) Patent No.: US 8,416,309 B2
(45) Date of Patent: Apr. 9, 2013

(54) CAMERA-FITTED INFORMATION RETRIEVAL DEVICE

(75) Inventors: Takashi Yoshimaru, Kokubunji (JP); Yujin Tsukada, Saitama (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 12/014,328

(22) Filed: Jan. 15, 2008

(65) Prior Publication Data
US 2009/0096875 A1 Apr. 16, 2009

(30) Foreign Application Priority Data
Mar. 29, 2007 (JP) .................................. 2007-088703

(51) Int. Cl.
*H04N 5/232* (2006.01)
(52) U.S. Cl.
USPC ................................ 348/211.99; 348/333.02
(58) Field of Classification Search ............... 348/211.99
See application file for complete search history.

(56) References Cited

U.S. PATENT DOCUMENTS

| 6,222,583 | B1 * | 4/2001 | Matsumura et al. | 348/113 |
|---|---|---|---|---|
| 7,826,967 | B2 * | 11/2010 | Jung | 701/208 |
| 2006/0195858 | A1 * | 8/2006 | Takahashi et al. | 725/19 |
| 2007/0165968 | A1 * | 7/2007 | Terayoko | 382/305 |

FOREIGN PATENT DOCUMENTS

| JP | 2003-122757 | | 4/2003 |
|---|---|---|---|
| JP | 2003-323440 | | 11/2003 |
| JP | 2003323440 | A * | 11/2003 |
| JP | 2004-320464 | | 11/2004 |

OTHER PUBLICATIONS

TR10:Augmented Reality, Technology Review published by MIT, Mar. 12, 2007. http://www.technologyreview.com/Infotech/18291/.

* cited by examiner

Primary Examiner — Anthony J Daniels
(74) Attorney, Agent, or Firm — Mattingly & Malur, PC

(57) ABSTRACT

When instructions for retrieval is given in a portable information device, together with a camera image obtained by a camera, additional information including position information provided by a CPS device, orientation information of the camera provided by a geomagnetic sensor, lens focal length information and photographing magnification information of the camera is transmitted to a retrieval service server. The retrieval service server, based on the additional information, retrieves a target within a photographing range from the current position of the camera, and recognizes the target by image recognition or character recognition of the camera image, and returns these target-related information as a retrieval result to the portable information device. The portable information device, by specifying a desired target based on the retrieval result, can acquire contents of this target from a contents service server.

8 Claims, 22 Drawing Sheets

FIG. 7(a)

RETRIEVAL TARGET DATABASE

| | GEOGRAPHICAL POSITION (TWO-DIMENSIONAL POSITION AND HEIGHT) | TYPE | NAME | OUTLINES | INFORMATION STORAGE ADDRESS | RELATED KEYWORD |
|---|---|---|---|---|---|---|
| ID 01 | GEOGRAPHICAL POSITION (TWO-DIMENSIONAL POSITION AND HEIGHT) | TYPE | NAME | OUTLINES | INFORMATION STORAGE ADDRESS | RELATED KEYWORD |
| ID 02 | GEOGRAPHICAL POSITION (TWO-DIMENSIONAL POSITION AND HEIGHT) | TYPE | NAME | OUTLINES | INFORMATION STORAGE ADDRESS | RELATED KEYWORD |
| ID 03 | GEOGRAPHICAL POSITION (TWO-DIMENSIONAL POSITION AND HEIGHT) | TYPE | NAME | OUTLINES | INFORMATION STORAGE ADDRESS | RELATED KEYWORD |

FIG. 7(b)

RETRIEVAL ITEM LIST

| ID | PRIORITY | | | | | | |
|---|---|---|---|---|---|---|---|
| ID 0001 | | GEOGRAPHIC | COORDINATES ON AN IMAGE | GEOGRAPHICAL POSITION (TWO-DIMENSIONAL POSITION AND HEIGHT) | TYPE | NAME OUTLINES | INFORMATION STORAGE ADDRESS | RELATED KEYWORD |
| ID 0002 | PRIORITY | GEOGRAPHIC | COORDINATES ON AN IMAGE | GEOGRAPHICAL POSITION (TWO-DIMENSIONAL POSITION AND HEIGHT) | TYPE | NAME OUTLINES | INFORMATION STORAGE ADDRESS | RELATED KEYWORD |
| ID 0003 | | IMAGE | COORDINATES ON AN IMAGE | GEOGRAPHICAL POSITION (TWO-DIMENSIONAL POSITION AND HEIGHT) | PORTION IMAGE | ADDITIONAL INFORMATION OBTAINED BY IMAGE RECOGNITION | | |
| ID 0004 | | CHARACTER | COORDINATES ON AN IMAGE | GEOGRAPHICAL POSITION (TWO-DIMENSIONAL POSITION AND HEIGHT) | PORTION IMAGE | CHARACTER INFORMATION OBTAINED BY RECOGNITION | ADDITIONAL INFORMATION OBTAINED BY IMAGE RECOGNITION | |

FIG. 7(c)

LIST DATA TO BE RETURNED/LIST DATA SAVED AS RETRIEVAL MENU

| ID | Priority | Type | Coordinates on an Image | Geographical Position (two-dimensional position and height) | | | | Information Storage Address | Related Keyword |
|---|---|---|---|---|---|---|---|---|---|
| ID 0001 | | GEOGRAPHIC | COORDINATES ON AN IMAGE | GEOGRAPHICAL POSITION (TWO-DIMENSIONAL POSITION AND HEIGHT) | TYPE | NAME | OUTLINES | INFORMATION STORAGE ADDRESS | RELATED KEYWORD |
| ID 0002 | PRIORITY | GEOGRAPHIC | COORDINATES ON AN IMAGE | GEOGRAPHICAL POSITION (TWO-DIMENSIONAL POSITION AND HEIGHT) | TYPE | NAME | OUTLINES | INFORMATION STORAGE ADDRESS | RELATED KEYWORD |
| ID 0003 | | IMAGE | COORDINATES ON AN IMAGE | GEOGRAPHICAL POSITION (TWO-DIMENSIONAL POSITION AND HEIGHT) | PORTION IMAGE | ADDITIONAL INFORMATION OBTAINED BY IMAGE RECOGNITION | | | |
| ID 0004 | | CHARACTER | COORDINATES ON AN IMAGE | GEOGRAPHICAL POSITION (TWO-DIMENSIONAL POSITION AND HEIGHT) | PORTION IMAGE | CHARACTER INFORMATION OBTAINED BY RECOGNITION | ADDITIONAL INFORMATION OBTAINED BY IMAGE RECOGNITION | | |

FIG. 7(d)

CONTENTS TYPE LIST WEB

| | | | | |
|---|---|---|---|---|
| ID 0001-1 | INDEX LIST WEB | INDEX LIST ARTICLE, BLOG | INDEX LIST MOVING IMAGE | INDEX LIST WORD OF MOUTH |
| ID 0002-1 | INDEX LIST WEB | INDEX LIST ARTICLE, BLOG | INDEX LIST MOVING IMAGE | INDEX LIST WORD OF MOUTH |
| ID 0003-1 | INDEX LIST WEB | INDEX LIST ARTICLE, BLOG | INDEX LIST MOVING IMAGE | INDEX LIST WORD OF MOUTH |
| ID 0004-1 | INDEX LIST WEB | INDEX LIST ARTICLE, BLOG | INDEX LIST MOVING IMAGE | INDEX LIST WORD OF MOUTH |

CAMERA-FITTED INFORMATION RETRIEVAL DEVICE

CLAIM OF PRIORITY

The present application claims priority from Japanese application JP 2007-088703 filed on Mar. 29, 2007, the content of which is hereby incorporated by reference into this application.

BACKGROUND OF THE INVENTION (1) Technical Field of the Invention

The present invention relates to a camera-fitted information retrieval device for retrieving information related to facilities and places by using an image photographed with a camera.

(2) Description of Related Arts

Conventionally, when the user acquires his or her desired information, he or she performs information retrieval by using a personal computer or the like. In this case, to specify the desired information, a keyword is used. Even in portable information devices, such as portable phones, such retrieval is possible. Thus, for example, to acquire information of a tourist site, such as a temple, in a tourist place during a trip or the like, retrieval is performed with the name of the tourist site concerned being used as a keyword.

On the other hand, a technique has also been suggested which permits a portable information device such as a portable phone to acquire necessary information by using information on an image (camera image) photographed with a camera provided in this device and transmitting this camera image to a server.

As one example of this, from a portable phone terminal to a server, image data of a product photographed with this portable phone terminal and position information representing the current position of this portable phone terminal are transmitted, the server analyzes this image data to obtain feature information of the product, retrieves product information based on this feature information to specify the product, retrieves detailed information of this product and also retrieves, from among agencies dealing with this product, the one closest to the current position of the portable phone terminal, and then provides the detailed information of this product and map information such as a location of the agency to the portable phone terminal (for example, see Publication of Japanese unexamined Patent Application No. 2003-122757).

As another example, a technique has been suggested by which a service server receives and stores an image photographed with a camera of a portable phone and place information from a GPS representing the current position of this portable phone, and, upon request for this image from a user belonging to the same group as the user possessing this portable phone, provides this image and the place information to the user belonging to the same group after confirmation that he or she belongs to the same group. (Publication of Japanese unexamined Patent Application No. 2003-122757, Publication of Japanese unexamined Patent Application No. 2004-320464)

However, the aforementioned technique described in Publication of Japanese unexamined Patent Application Publication No. 2003-122757, by using the image of the product photographed with the camera of the portable phone terminal, provides services of introducing the detailed information of this project and the agency dealing with this product, but does not provide detailed information of places, facilities, etc. For example, when walking around a local unfamiliar region during a trip or the like, the user in some cases desires to immediately know detailed information, such as a historic site or a store desired for dining, based on the current position. However, the portable terminal described in Publication of Japanese unexamined Patent Application No. 2003-122757, even if it can treat a historic site or the like in the same manner as the product, cannot acquire detailed information of an object unless it directly photographs the object, and thus cannot function for an object that cannot be recognized based on the current position.

Moreover, the aforementioned technique described in Publication of Japanese unexamined Patent Application No. 2004-320464 stores a photographed image in the server and provides it to another user, and thus cannot provide detailed information of a place photographed.

SUMMARY OF THE INVENTION

It is an object of the present invention to address the problem described above and to provide a camera-fitted information retrieval device capable of, based on an image photographed with a camera, immediately providing the user with detailed information, such as facilities and places within a photographing range of this image.

To address the problem described above, according to one aspect of the present invention, a camera-fitted information retrieval device includes: a camera for photographing; a display section; a position detector detecting a current position; and an orientation detector detecting orientation of the camera. The camera-fitted information retrieval device further includes: means for transmitting to a server a camera image of the camera and additional information including position information detected by the position detector, orientation information detected by the orientation detector, and lens focal length information and photographing magnification information of the camera and then requesting for retrieval of at least one target within a photographing range of the camera image; means for receiving from the server retrieval results related to a target within the photographing range of the camera detected based on the additional information or a target detected based on information in the camera image; and a processor processing the received retrieval results and causing a retrieval screen for each of the targets to be displayed on a display screen of the display section. On the retrieval screen, selection information corresponding to the target is displayed on an individual target basis and the selection information is selected, allowing acquiring detailed information related to the corresponding target.

In the invention, on the display screen, the camera image may be displayed, and also item marks for the respective targets are arrayed and displayed as the selection information, and a target mark corresponding to the item mark may be displayed at a position where the target is present in the camera image, so that the item mark and the target on the camera image corresponding to the item mark are associated with each other.

In the invention, on the display screen, the camera image may be displayed, and item marks as the selection information may be displayed for the respective targets. The item marks for the respective targets may be displayed at positions of the corresponding targets in the camera image.

In the invention, based on the retrieval results of the server, contents type indexes indicating contents types of the target corresponding to the selected selection information may be arrayed and displayed, and any of the contents type indexes may be selected, allowing retrieval of contents of the type corresponding to the selected contents type index.

In the invention, a storage may be provided which stores and saves the camera image and the additional information, or the camera image, the additional information, and the retrieval results provided by the server.

In the invention, the retrieval on the server can be performed by using the camera image and the additional information saved in the storage In the invention, means for transmitting the camera image and the additional information saved in the storage to another information retrieval device may be provided.

According to the present invention, retrieval of a target (shop, historic site, or the like) within a photographing range can be performed with a camera screen photographed and related additional information. Thus, the user, only by performing photographing with a camera oriented in a desired direction, can recognize various targets within his or her visual field from a place of this camera (within a photographing range), and can also acquire detailed information of the targets.

BRIEF DESCRIPTION OF THE DRAWINGS

These and other features, objects and advantages of the present invention will become more apparent from the following description when taken in conjunction with the accompanying drawings wherein:

FIGS. 7A to 7D are diagrams illustrating retrieval operation in the retrieval service server in FIG. 3;

DETAILED DESCRIPTION OF THE PREFERRED EMBODIMENTS

Hereinafter, the embodiments of the invention will be described, with reference to the accompanying drawings.

Figure 1:
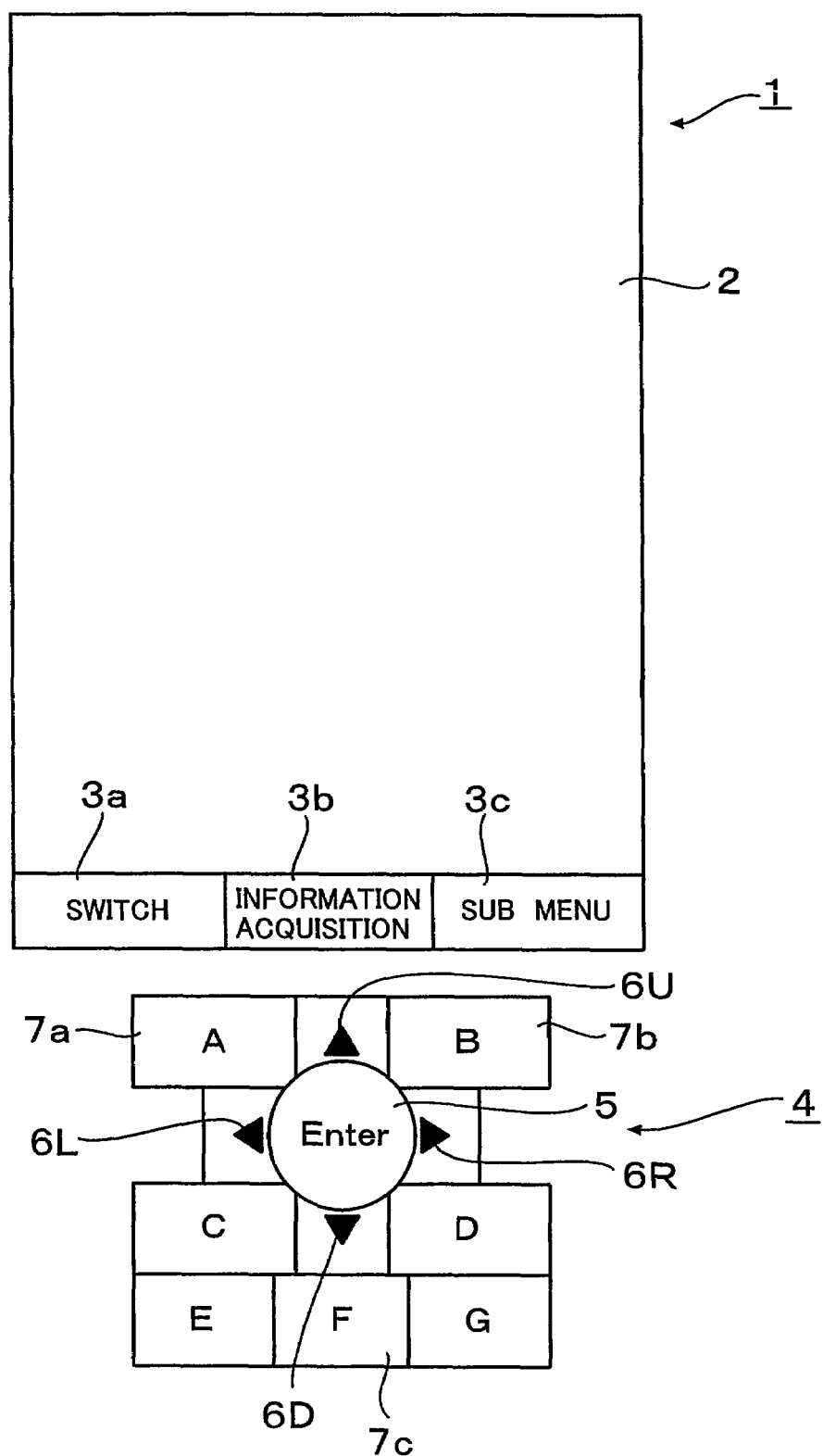
FIG. 1 is a configuration diagram showing main parts of one embodiment of a camera-fitted information retrieval device according to the present invention.

FIG. 1 is a configuration diagram showing main parts of one embodiment of a camera-fitted information retrieval device according to the present invention. Numeral 1 denotes a portable information device, numeral 2 denotes a display screen, numerals 3a, 3b, and 3c denote function screen display areas, numeral 4 denotes an operation section, numeral 5 denotes an ENTER key, numeral 6U denotes an UP key, 6D denotes a DOWN key, numeral 6L denotes a LEFT key, 6R denotes a RIGHT key, numerals 7a and 7b denote operation keys, and numeral 7c denotes a "RETURN" key. Here, as an example of the camera-fitted information retrieval device, a portable information device such as a portable phone will be described.

In the same figure, the portable information device 1 has the display screen 2, the operation section 4, etc. and also a camera etc., not shown, provided in a casing, not shown.

On the display screen 2, a screen for operation of the operation section 4, or a screen for photographing with a camera, a retrieval screen, etc., to be described later, is displayed. Illustrated as one example is a state that the function screen display areas 3a to 3c are displayed on the display screen 2. They are displayed upon information retrieval, and functions displayed on these function screen display areas are changed in accordance with a stage of retrieval. Illustrated here is a state that a "Switch" function screen for mode switching is displayed on the function screen display area 3a, an "Information acquisition" function screen is displayed on the function screen display area 3b, and a "Sub menu" function screen is displayed on the function screen display area 3c.

The function screen displayed on the function screen display area 3a represents the function of the operation key 7a in the operation section 4. In this case, it is indicated that the operation key 7a has "Switch" function. The function screen displayed on the function screen display area 3b represents the function of the ENTER key 5 in the operation section 4. In this case, it is indicated that the ENTER key 5 has "Information acquisition" function. The function screen displayed on the function screen display area 3c represents the function of the operation key 7b in the operation section 4. In this case, it is indicated that the operation key 7b has "Sub menu" function.

The "RETURN" key 7c in the operation section 4 has the function of returning to a last screen displayed on the display screen 2. Moreover, in the operation section 4, other operation keys such as a power key and a numeric keypad are provided, which are the same as those of an ordinary portable information device, and thus their description will be omitted.

Figure 2:
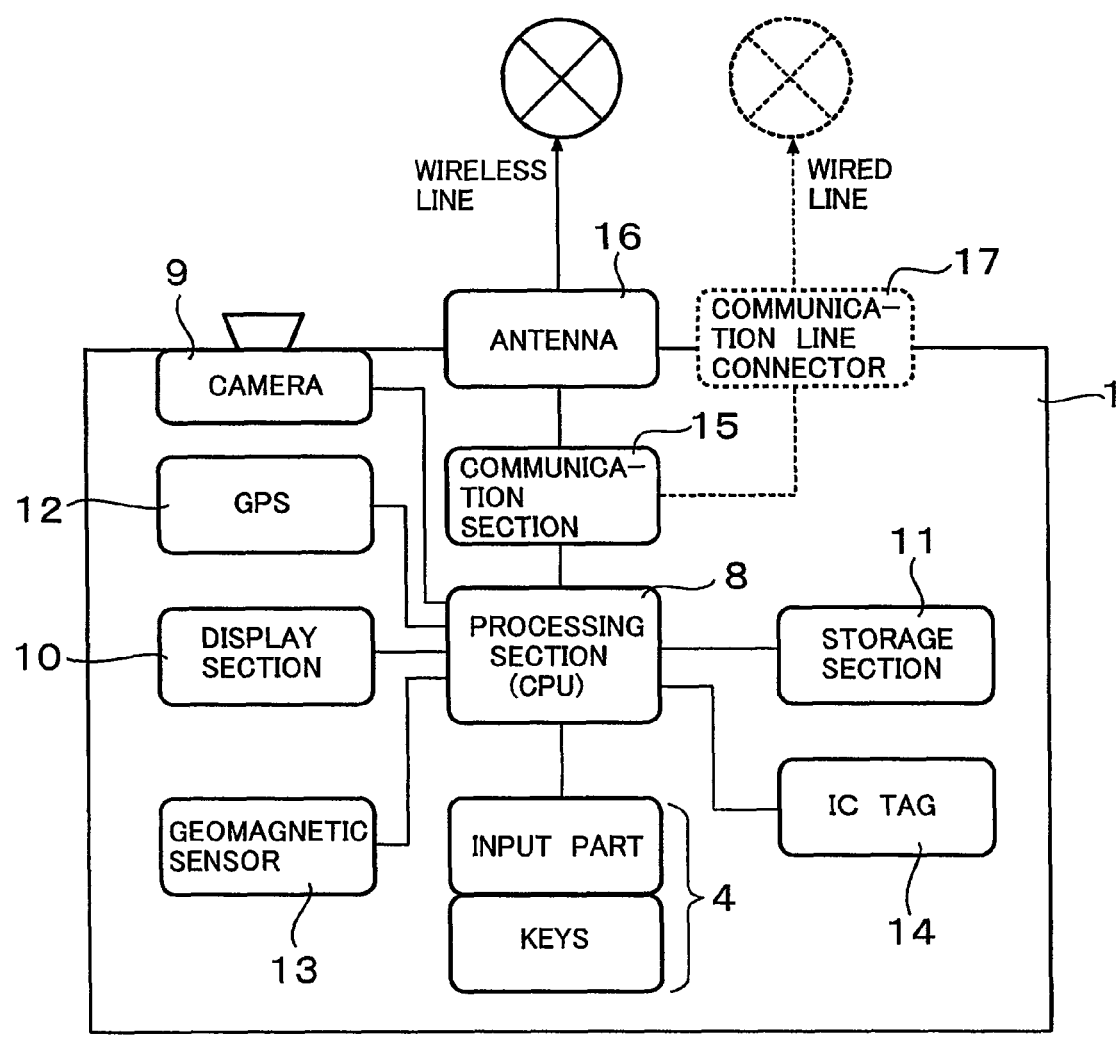
FIG. 2 is a block diagram showing circuit configuration of a portable information device shown in FIG. 1.

FIG. 2 is a block diagram showing circuit configuration of the portable information device 1 shown in FIG. 1. Numeral 8 denotes a processing section, numeral 9 denotes a camera, numeral 10 denotes a display section, numeral 11 denotes a storage section, numeral 12 denotes a GPS (Global Positioning System) device, numeral 13 denotes a geomagnetic sensor, numeral 14 denotes an IC tag, numeral 15 denotes a communication section, numeral 16 denotes an antenna, and numeral 17 denotes a communication line connector. Portions corresponding to those in FIG. 1 are provided with the same numerals and their overlapping description will be omitted.

In the same figure, in the portable information device 1, in accordance with a key operation signal from a key operation input part of the operation section 4, the processing section 8 composed of a CPU, etc. operates to control the various sections under programs stored in the storage section 11. Under this control, the camera 9, such as a CCD video camera, photographs a subject, and the display section 10 displays various screens on the display screen 2 (FIG. 1) of the portable information device 1. The communication section 15, under the control of the processing section 8, performs wireless communication with the outside via the antenna 16, and also performs wire communication with the outside via the communication line connector 17. The storage section 11 stores the aforementioned programs, information on screens for the operation of the operation section 4 etc. and also stores images photographed with the camera 9 and various information acquired via the communication section 15.

In the portable information device 1, the GPS device 12 and the geomagnetic sensor 13 are provided. The GPS device 12 detects the current position of the portable information device 1 and supplies it to the processing section 8. The geomagnetic sensor 13 detects the orientation of the portable information device 1, that is, the direction of photographing with the camera 9, and supplies it to the processing section 8. Instead of the geomagnetic sensor 13, a gyroscope may be used.

The camera 9 detects a lens focal length and a photographing magnification and supplies these information to the processing section 8.

In the portable information device 1, the IC tag 14 is detachable, and tag information thereof is read and supplied to the processing section 8.

This portable information device 1 is configured to be able to retrieve, with a historic site such as a temple or a shrine, a shop, or the like provided as a retrieval target, information thereof (hereinafter referred to as a retrieval item). For this retrieval, a still image photographed with the camera 9 is used. Specifically, a historic site, a shop, or the like projected on this photographed still image (hereinafter referred to as camera image A) serves as a target of retrieval. Information on this still image is transmitted from the communication section 15 to a server (not shown) whereby retrieval is performed in the server. Upon this retrieval, together with this camera image A, position information detected by the GPS device 12, orientation information detected by the geomagnetic sensor 13, lens focal length information and photographing magnification information detected by the camera 9, etc. are transmitted as additional information B to the server, which, by using these camera image A and additional information B, retrieves items within a photographing range of this camera image A.

Figure 3:
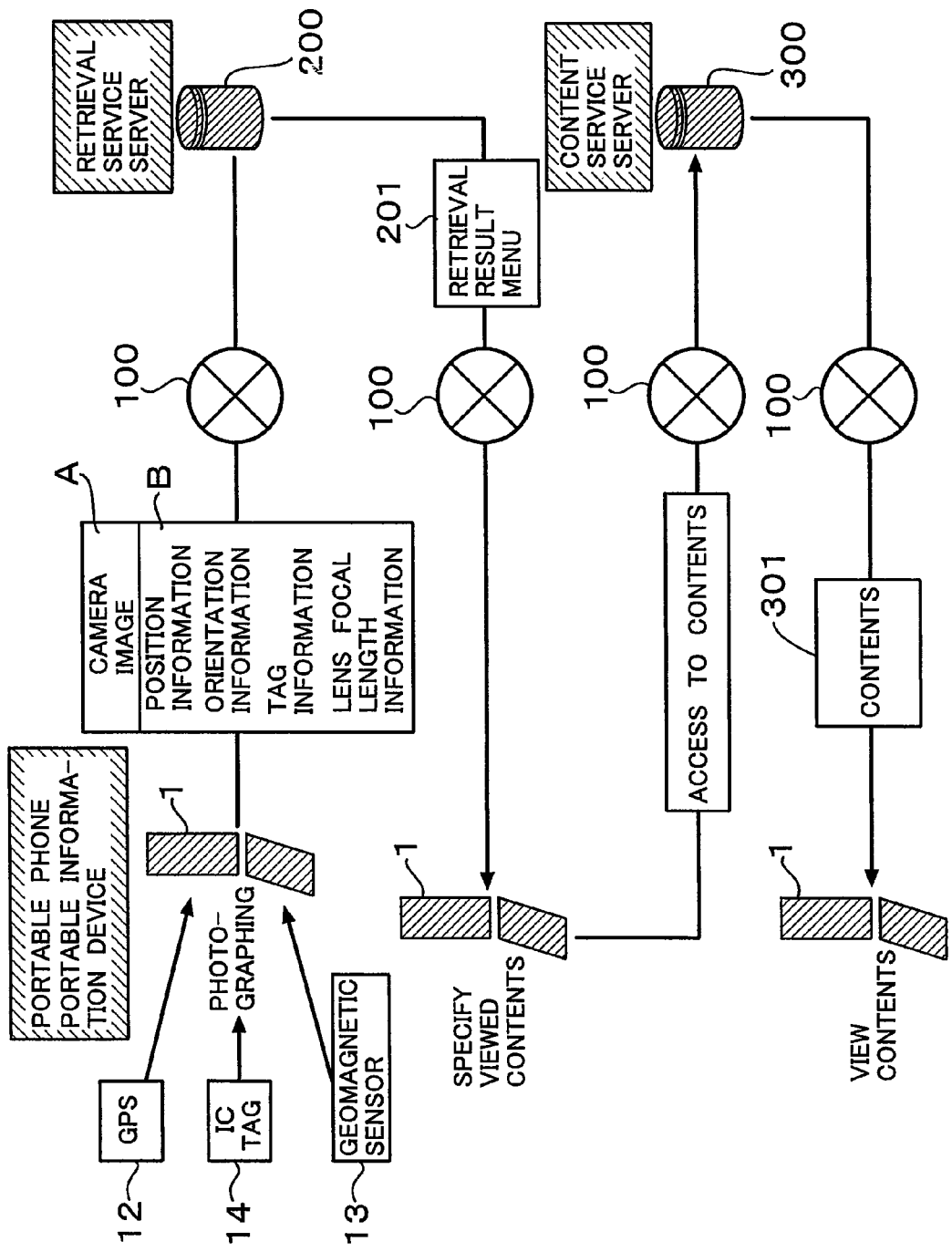
FIG. 3 is a system configuration diagram showing an information retrieval system employing the embodiment shown in FIGS. 1 and 2.

FIG. 3 is a system configuration diagram showing an information retrieval system employing the embodiment shown in FIGS. 1 and 2. Numeral 100 denotes a network, numeral 200 denotes a retrieval service server, and numeral 300 denotes a contents service server. Portions corresponding to those in FIG. 1 are provided with the same numerals and their overlapping description will be omitted.

In the same figure, when the user performs information retrieval operation on the portable information device 1 during photographing with the camera 9 of the portable information device 1, a still image obtained by this photographing, that is, the camera image A in FIG. 2, together with the additional information B including the position information provided by the GPS device 12, the orientation information of the camera 9 (information indicating the photographing direction) provided by the geomagnetic sensor 13, the tag information from the IC tag 14, and the lens focal length information and the photographing magnification information of the camera 9 are supplied from the communication section 15 (FIG. 2) to the retrieval service server 200 via the network 100 such as the Internet.

Figure 4:
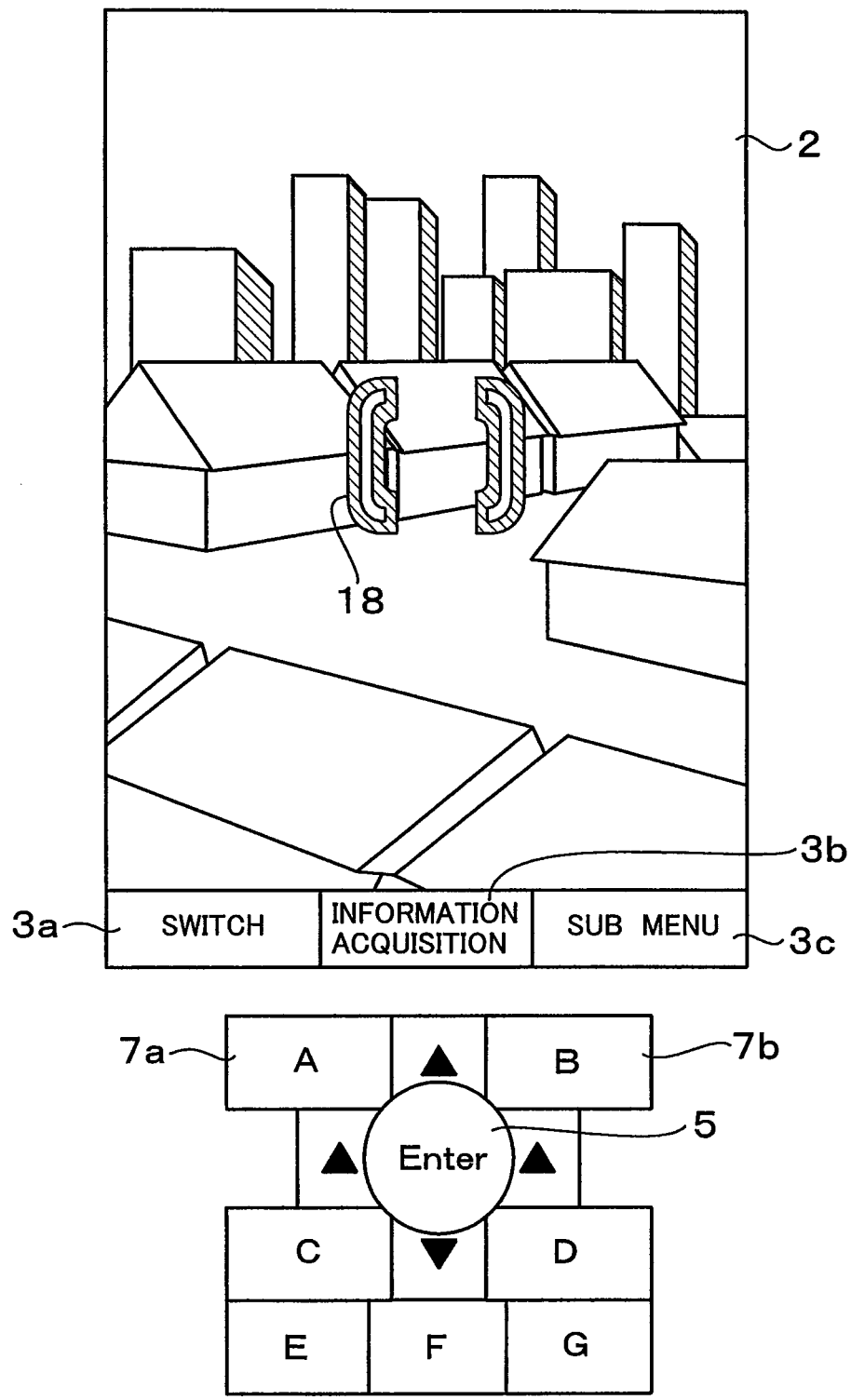
FIG. 4 is a diagram showing a display state on a display screen of the portable information device shown in FIG. 1 at camera photographing, where numeral 18 denotes a priority range specifying mark.

FIG. 4 is a diagram showing a state on the display screen 2 of the portable information device 1 at photographing with the camera 9. Numeral 18 denotes a priority range specifying mark. Portions corresponding to those in FIGS. 1 and 2 are provided with the same numerals and their overlapping description will be omitted.

At the photographing with the camera 9, as shown in FIG. 4, on the display screen 2 of this portable information device 1, a screen (hereinafter referred to as photographed screen) to be photographed with the camera 9 is displayed. At this point, on the display screen 2, in accordance with the functions displayed on the function screen display areas 3a to 3c, the operation key 7a is provided with "Switch" function, the operation key 7c is provided with "Sub menu" function, and the ENTER key 5 is provided with "Information acquisition" function. Thus, when the operation key 7a is operated to switch the mode to set the retrieval mode, a central part of the photographed screen displayed on the display screen 2 is specified as a target range prioritized for photographing, and the mark (priority range specifying mark) 18 specifying this range is displayed. This priority range specifying mark 18 may be displayed upon start of photographing.

Figure 5:
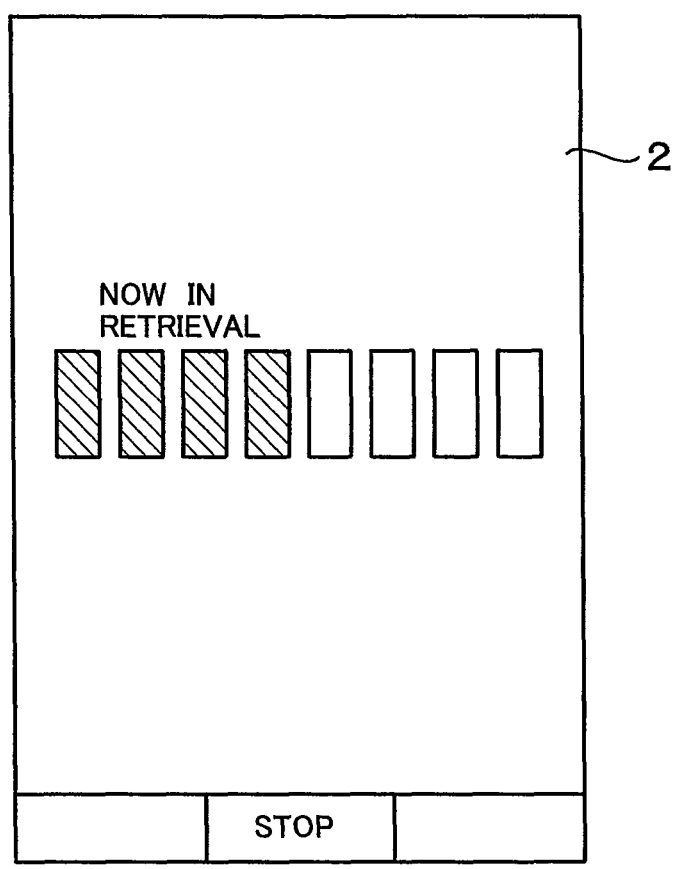
FIG. 5 is a diagram showing a display state on the display screen of the portable information device shown in FIG. 1 at item retrieval.

In this photographing state, when the ENTER key 5 provided with the "Information acquisition" function is operated, as described above, the additional information B, together with the camera image A with the priority range specifying mark 18 added thereon, is transmitted to the retrieval service server 200. On the display screen 2, as shown in FIG. 5, the progress of retrieval processing is displayed.

Referring back to FIG. 3, the retrieval service server 200, upon reception of the additional information B together with the camera image A from the portable information device 1, performs retrieval of a retrieval item in the camera image A by using this additional information B.

Figure 6A:
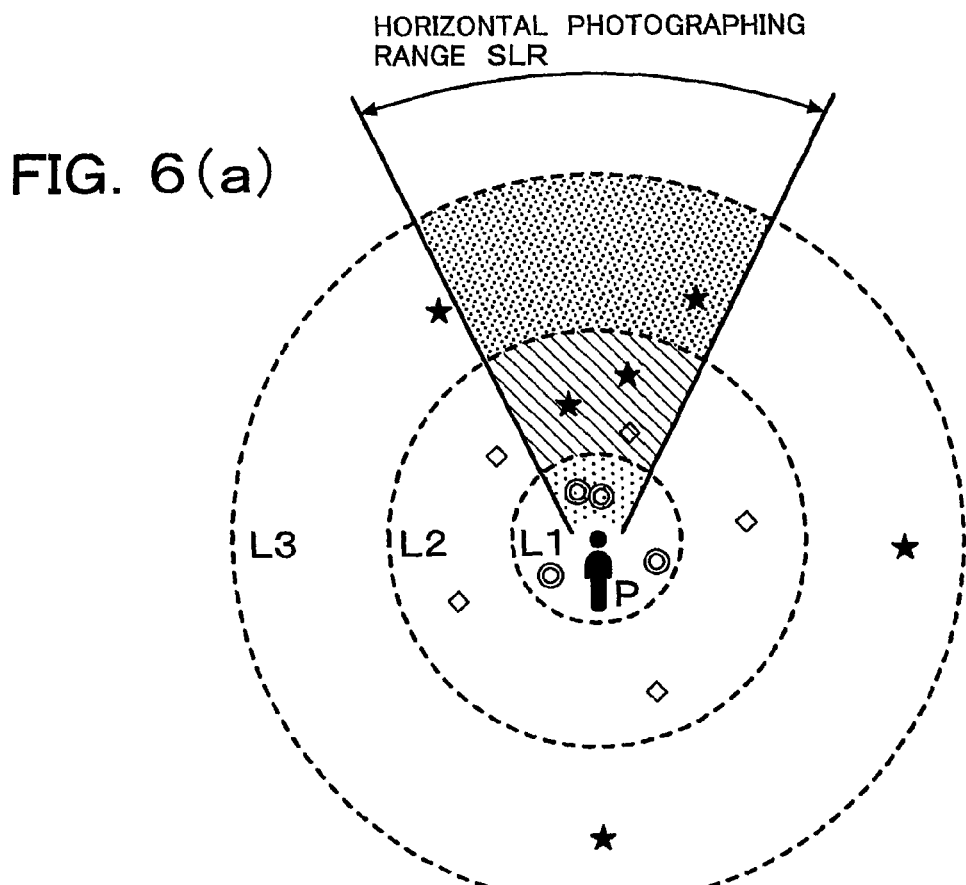
FIGS. 6A and 6B are diagrams showing photographing ranges detected by a retrieval service server in FIG. 3.
Figure 6B:
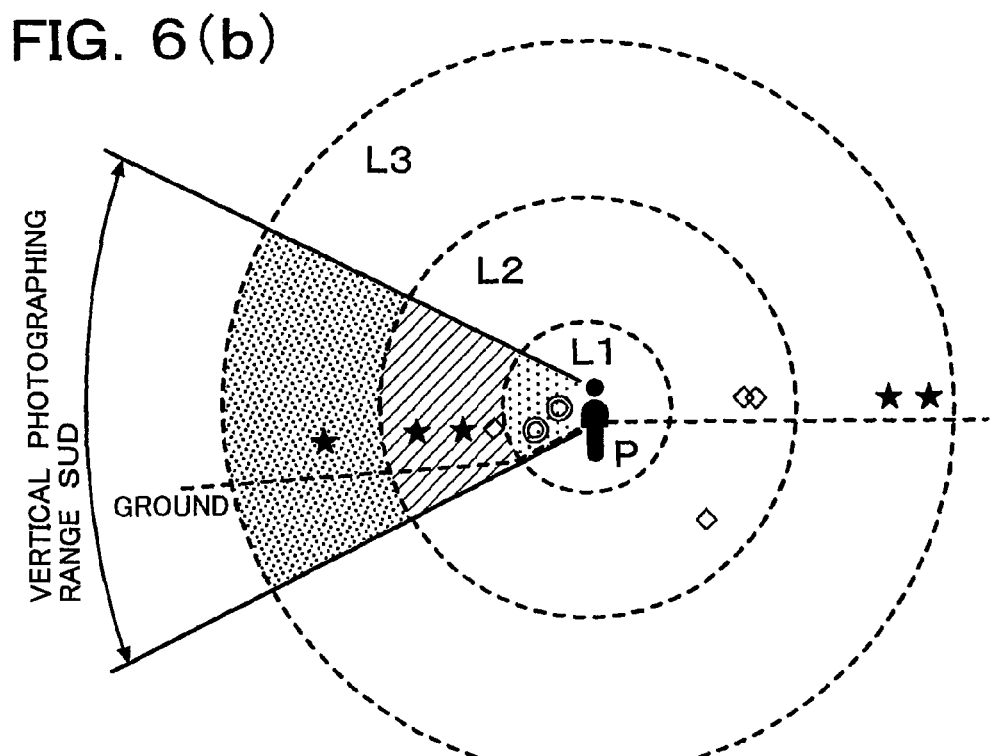

In this retrieval, based on the position information and the orientation information included in the additional information B, a current position P of the portable information terminal 1 on the map and a photographing direction from this position P are determined, and based on the lens focal length information and the photographing magnification information, a horizontal photographing range (view angle) $S_{LR}$, as shown in FIG. 6A, as viewed from the current position P in the direction of photographing with the camera 9 and a vertical photographing range (view angle) $S_{UD}$ as shown in FIG. 6B are obtained, and retrieval items of targets within these horizontal photographing range $S_{LR}$ and vertical photographing range $S_{UD}$ are obtained.

Here, in accordance with a distance from the current position P, for example, classification into a within-close-distance region $L_1$, a within-intermediate-distance region $L_2$, and a within-circle-processing region $L_3$ is made, and different types of items are retrieved for the different regions. For example, item retrieval is performed in the within-close-distance region $L_1$ for facilities and places (indicated by a double circle mark), such as restaurants, buffets, souvenir shops, and the like, which the user instantly uses, item retrieval is performed in the within-close-distance region $L_1$ and the within-intermediate-distance region $L_2$ for facilities and places (indicated by a rhombus mark), such as department stores and theaters, which the user spends some time in utilizing, item retrieval is performed in all the regions including the within-close-distance region $L_1$, the within-intermediate-distance region $L_2$, and the long-distance region $L_3$ for places and facilities (indicated by a black star-shaped mark), such as historic sites and the like, which the user spends much time in visiting.

A facility and a place specified by the priority range specifying mark 18 shown in FIG. 4 are considered as a target directly intended by the user for retrieval, and retrieval of items of this target is performed. Further, character information, such as that on a signboard, in the camera image and the shape of an image, such as a tower, in the camera image are recognized, and if these represent a facility or a place, item retrieval is performed with these also provided as retrieval targets. This retrieval can also be performed by using map information or other adequate information.

FIG. 7A schematically shows a database of retrieval items (retrieval target database) included in the retrieval service server 200. The retrieval service server 200 basically performs item retrieval by using this retrieval target database. This retrieval target database includes: for each of items, an ID (identifier) identifying the item, information on two-dimensional and heightwise positions of a target, a type of the target (kind such as a temple, a shop, or the like), a name of the target (name of a shop or the like), outlines (brief details), an information storage address (storage address of the item in this retrieval target database), and a related keyword (keyword for retrieving contents, to be described later, related to this target).

The retrieval service server 200, for targets obtained from this retrieval target database, or obtained by the aforementioned character recognition or image recognition, by using the map information or other adequate information, retrieves items of targets within the photographing ranges shown in FIGS. 6A and 6B, and concludes results of this retrieval to prepare a retrieval item list as shown in FIG. 7B.

This retrieval item list includes, as is with the retrieval target database shown in FIG. 7A, IDs, geographical positions, types, names, outlines, information storage addresses, related keywords, and additionally has "priority" information for an item of a target within the priority range specifying mark 18 (FIG. 4). Moreover, as a method of recognizing a target, of these items, those of a target from the retrieval target database of FIG. 7A are provided with information "Geographic", those of a target, such as a tower, image-recognized from the camera image A are provided with information "Image", and those of a target, such as a signboard, character-recognized from the camera image A are provided with information "Character". Then, the item of a target image-recognized is further provided with a portion image thereof and "Additional information obtained by image recognition". The item of a target character-recognized is further provided with a portion image thereof, and "Character information obtained by image recognition" and "Additional information obtained by image recognition".

Furthermore, the items are provided with "coordinates on an image" representing the positions of these targets in the camera image A.

FIGS. 7C and 7D show a retrieval result menu 201 (FIG. 3) returned, together with the camera image A transmitted from the portable information device 1, to the portable information device 1 from the retrieval information service server 200 via the network 100. The menu in FIG. 7C is identical to the retrieval item list shown in FIG. 7B.

On the other hand, in FIG. 3, the portable information device 1 receives this retrieval result menu 201 together with the camera age A, and stores it into the storage section 11 (FIG. 2) and also by using these camera image A and retrieval result menu 201, displays on the display screen 2 a retrieval screen for performing retrieval of contents for a desired item. When retrieval operation for this is performed, access to the contents service server 300 for contents is made via the network 100. In this contents service server 300, the contents are classified into four types, "WEB", "Article, Blog", "Moving image", and "Word of mouth", for each type of which an index is set.

FIG. 7D shows types of contents set for the respective items. Here, it is assumed that all the types of contents are provided for the items illustrated, but those items for which the certain type of contents is not provided do not include this type of contents.

The portable information device 1, upon receiving, together with the camera image A, a list representing the types of contents for the respective items shown in FIG. 7D as the retrieval result menu 201 from the retrieval service server 200, displays information based on the contents type list shown in FIG. 7D, together with information based on the list data shown in FIG. 7C, on the display screen 2 where the camera image A is displayed, so that contents for a specified item can be retrieved by the contents service server 300 on an individual contents type basis.

In this manner, contents 301 retrieved by the contents service server 300 are returned to the portable information device 1 via the network 100 and displayed on the display screen 2.

The portable information device 1, since it saves the retrieval result menu 201 (the data list of FIG. 7C and the contents type list of FIG. 7D) returned from the retrieval service server 200 and the camera image A in the storage part 11 (FIG. 2), by reading them out from the storage section 11 at a later date and displaying them on the display screen 2, can perform retrieval of the same contents. Moreover, the portable information device 1, by transmitting and providing the camera image A and the retrieval result menu 201 to another portable information device, permits the same contents retrieval to be also performed in the portable information device which has been provided with this retrieval result menu 201.

Figure 8A:
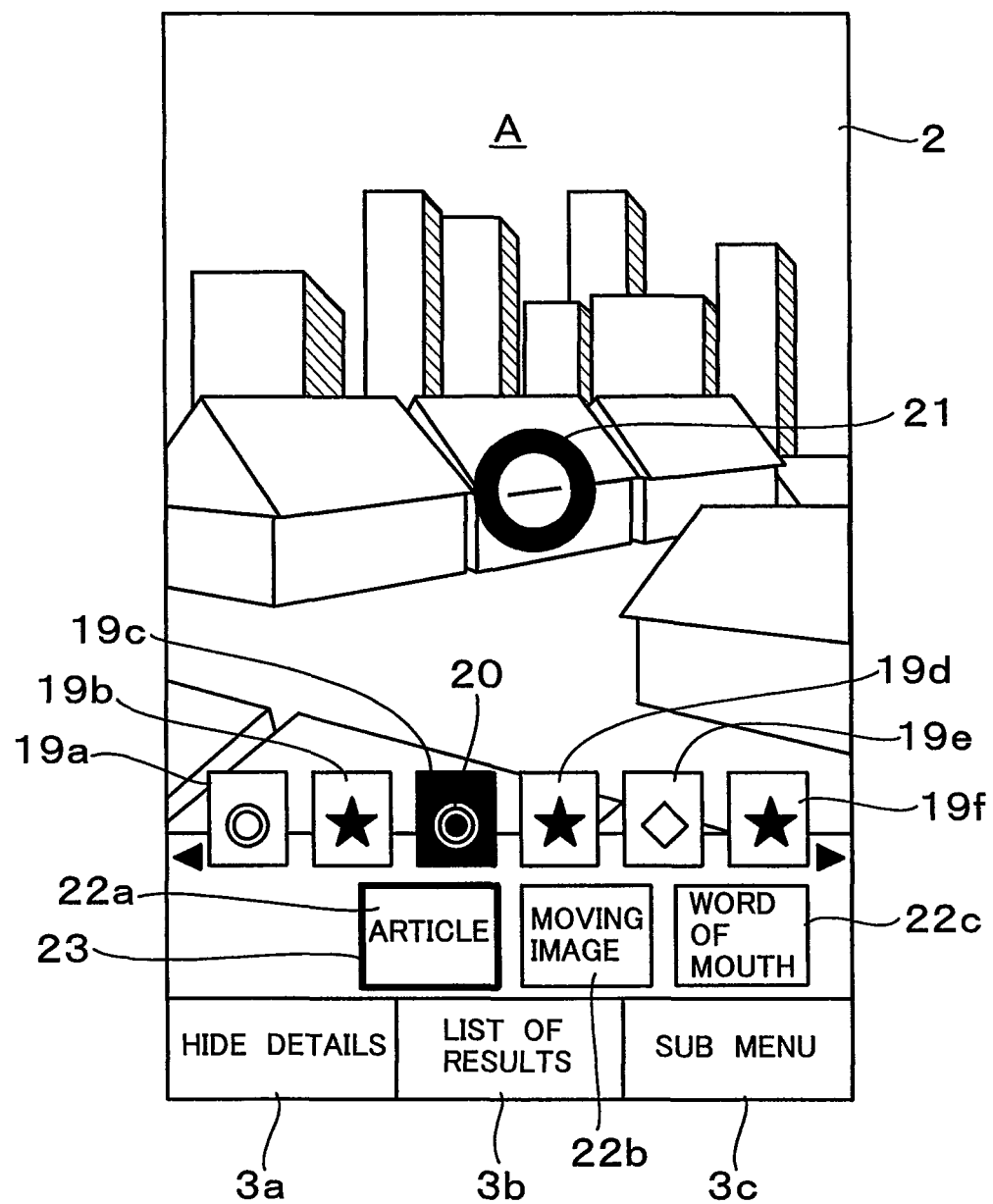
FIGS. 8A to 8D are diagrams showing one detailed example of retrieval screens displayed on the display screen of the portable information device based on a retrieval result menu of the retrieval service server in FIG. 3.
Figure 8B:
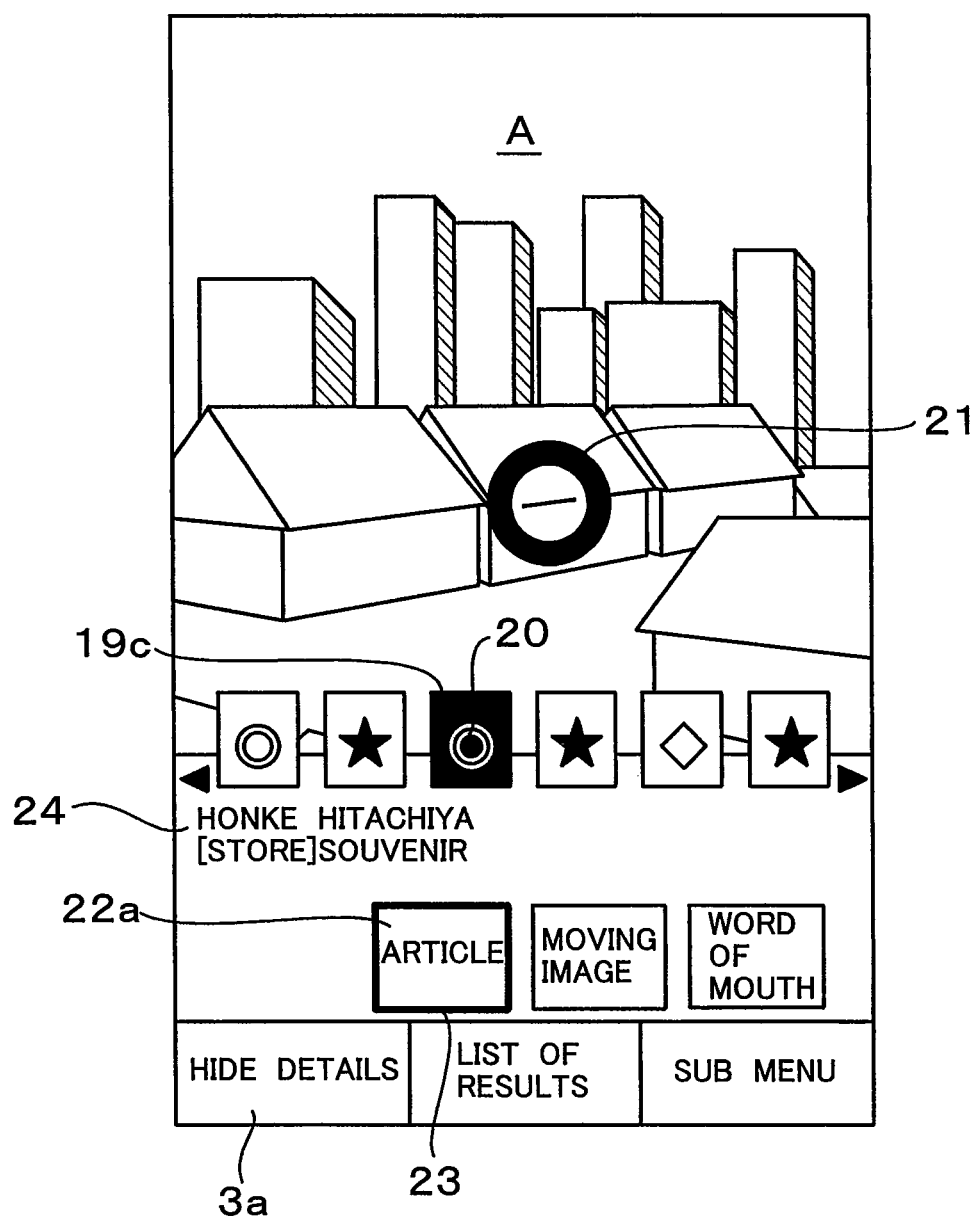
Figure 8C:
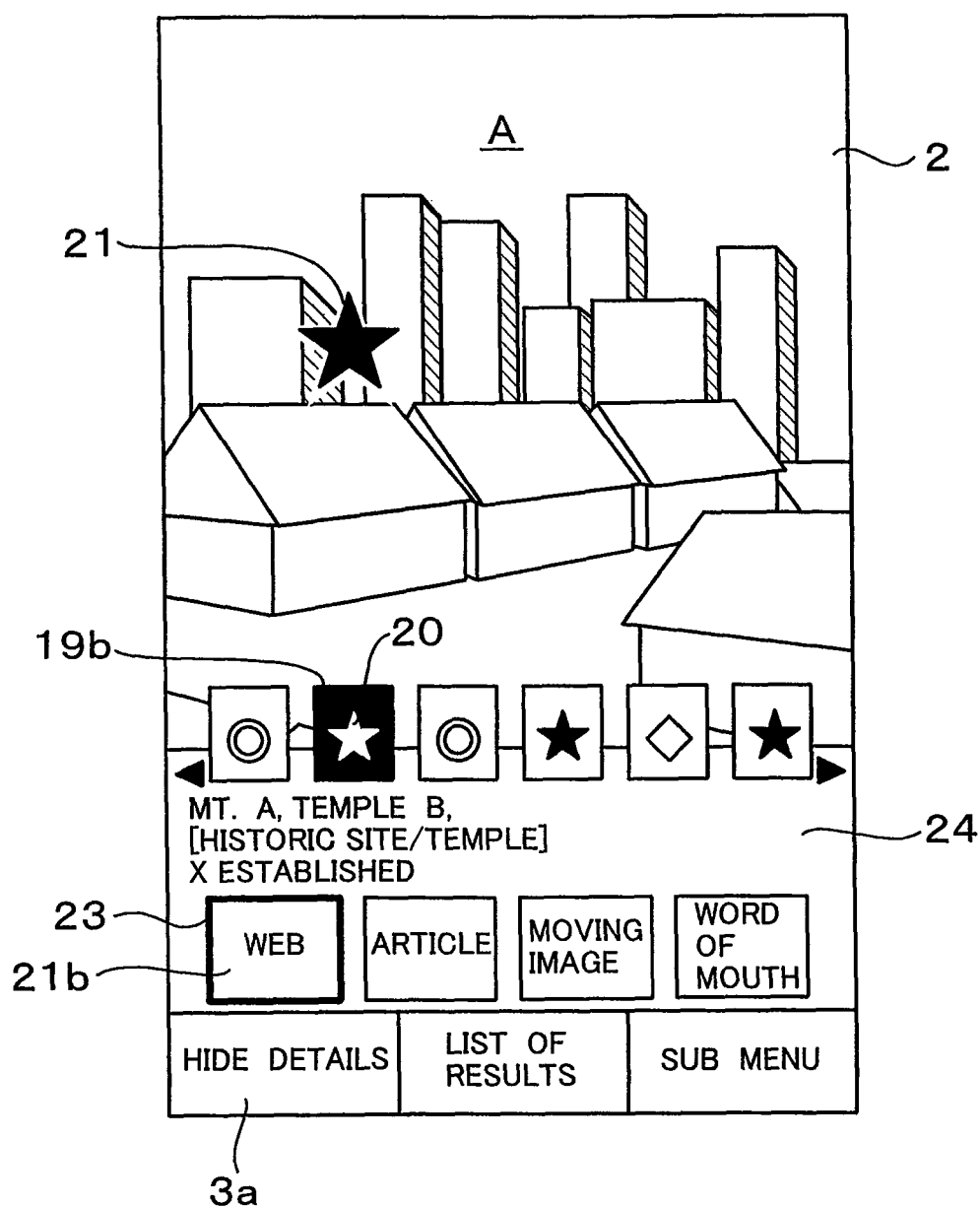
Figure 8D:
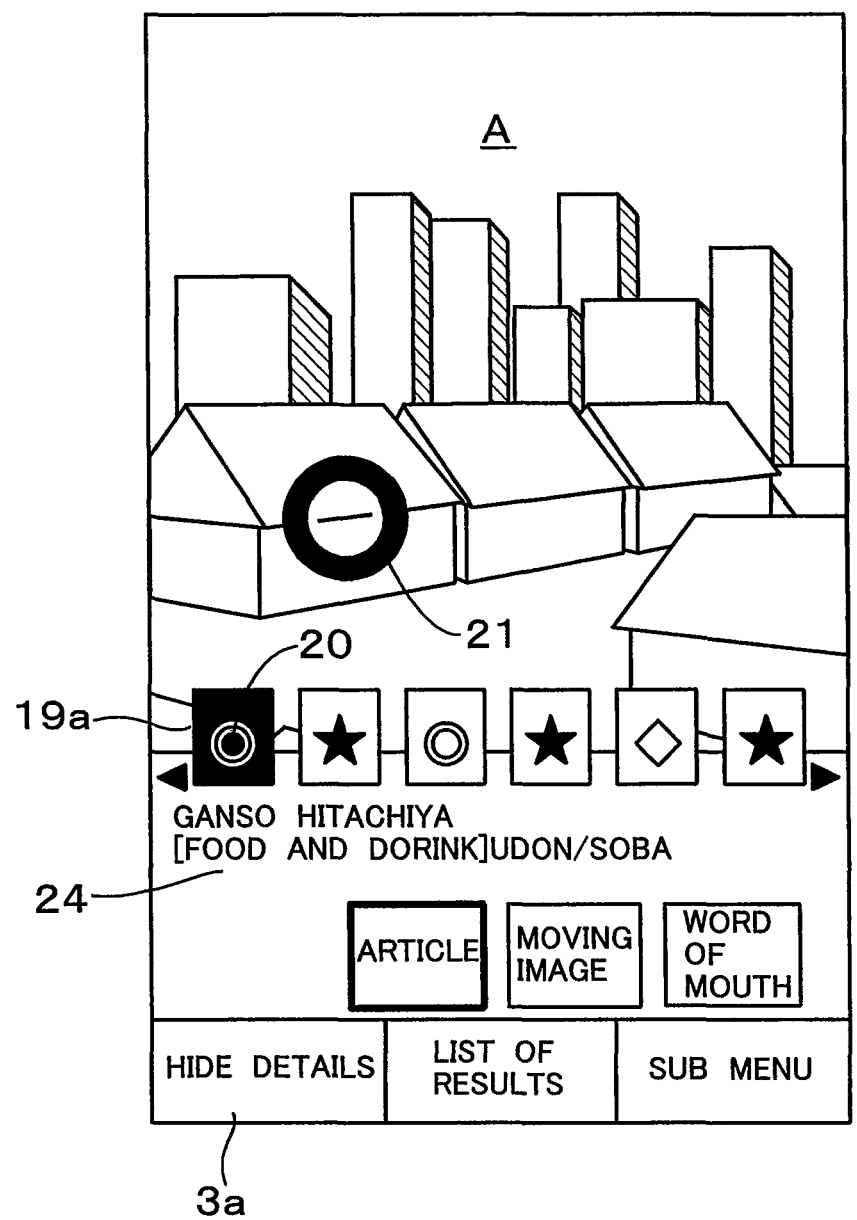

FIGS. 8A to 8D are diagrams showing one detailed example of retrieval screens displayed on the display screen 2 of the portable information device 1 based on the retrieval result menu 201 of the retrieval service server 200 (FIG. 3). In these figures, numerals 19a to 19f denote item marks, numeral 20 denotes a cursor, numeral 21 denotes a target mark, numerals 22a to 22d denote contents type indexes, numeral 23 denotes a cursor, and numeral 24 denotes detailed information. Portions corresponding to those in the figures already described above are provided with the same numerals and their overlapping description will be omitted. In FIGS. 8B to 8D, only necessary portions are provided with numerals for simplified illustration.

In FIG. 8A, on the display screen 2, the camera image A returned from retrieval service server 200 is displayed, and together therewith, based on the data list shown in FIG. 7C, the item marks 19a to 19f having different shapes for the different items in this list data are arrayed and displayed, with any one of these item marks 19a to 19f being specified by the cursor 20 (is initially specified by the item mark for "priority" information), and at the target position in the camera image A corresponding to this specified item mark, here, the item mark 19c, the target mark 21 of the same shape is provided and displayed.

These item marks 19a to 19f are respectively assigned to the IDs of the items in the list data shown in FIG. 7C, and the display position of the target mark 21 in the camera image A is determined by "coordinates on the image" in the list data shown in FIG. 7C.

On the display screen 2 shown in FIG. 8A, the contents type indexes 22a to 22c are displayed. These contents type indexes 22a to 22c are based on the contents type list shown in FIG. 7D, and represent contents types for the item specified by the item mark 19 (any of the item marks 19a to 19f) and allows selectively retrieving any of these contents. Here, for the item for the item mark 19c specified, three contents types, "Article, Blog", "Moving image", and "Word of mouth" are provided. Any one (content type index 22a for "Article, Blog" in this case) of the contents type indexes 22a to 22c is specified by the cursor 23.

These cursors 20 and 23 can be operated by operating the UP key 6U, the DOWN key 6D, the LEFT key 6L, and the RIGHT key 6R in the operation section 4 in FIG. 1. In this case, the UP key 6U and the DOWN key 6D are provided for moving the cursors 20 and 23 up and down. Operating the UP key 6U specifies the upper cursor 20, and operation of the LEFT key 6L and the RIGHT key 6R permits sliding the cursor 20 from left to right or vice versa to arbitrarily specify any of the item marks 19a to 19f. Operating the DOWN key 6D specifies the lower cursor 23, and operation of the LEFT key 6L and the RIGHT key 6R permits sliding the cursor 23 from left to right or vice versa to arbitrarily specify any of the contents type indexes 22a to 22c.

In the display state shown in FIG. 8A, a "Details" function screen is displayed on the function screen display area 3a, a "List of results" function screen is displayed on the function screen display area 3b, and a "Sub menu" function screen is displayed on the function screen display area 3c. When the operation key 7a (FIG. 7) provided with "Details" function is operated, as shown in FIG. 8B, based on the "outlines" information on the list data shown in FIG. 7C, detailed information 24 (outlines of the target) related to the target corresponding to the item mark 19c specified at this point (that is, target provided with the target mark 21) is displayed as, for example, "Honke Hitachiya", "Store", "Souvenir". At this point, on the function screen display area 3a, instead of the "Details" function screen, a "Hide details" function screen is displayed, and when the operation key 7a (FIG. 1) provided with this function is operated, the display of the detailed information 24 disappears and the display state returns to the state shown in FIG. 8A.

When the cursor 20 is moved to the left immediate item mark 19b in the display state shown in FIG. 8A, the target corresponding to this item mark 19b is provided with the target mark 21 of the same shape as that of this item mark 19b. Assuming that there are provided four contents types, "WEB", "Article, Blog", "Moving image", and "Word of mouth", for an item of this item mark 19b, the contents type index 22a for "WEB", the contents type index 22b for "Article, Blog", the contents type index 22c for "Moving image", and the contents type index 22d for "Word of mouth" are arrayed and displayed. Then, when any of these contents type indexes 22a to 22d, the contents type index 22a for "WEB" in this case, is specified by the cursor 23 and the operation key 7a (FIG. 1) is operated, detailed information (outlines) of the target corresponding to the item mark 19b is displayed as, for example, "Mt. A, Temple B, "Historic place/Temple", X established" as shown in FIG. 8C.

At this point, on the function screen display area 3a, instead of the "Details" function screen, a "Hide details" function screen is displayed, and when the operation key 7a (FIG. 1) provided with this function is operated, a display of the detailed information 24 disappears.

FIG. 8D shows a state of the detailed information 24 being displayed by moving the cursor 20 in the display state of FIG. 8C further to the next immediate left position in the same manner.

FIGS. 9A to 9D show another detailed example of the retrieval screens displayed on the display screen 2 of the portable information device 1 based on the retrieval result menu 201 of the retrieval service server. In these figures, numeral 25 denotes a retrieval menu screen, numeral 26 denotes a scroll bar, numeral 27 denotes a cursor, and numeral 28 denotes moving image contents. Portions corresponding to those in FIGS. 8A to 8D are provided with the same numerals and their overlapping description will be omitted. In FIGS. 9A to 9D, only necessary portions are provided with numerals for simplified illustration.

Figure 9A:
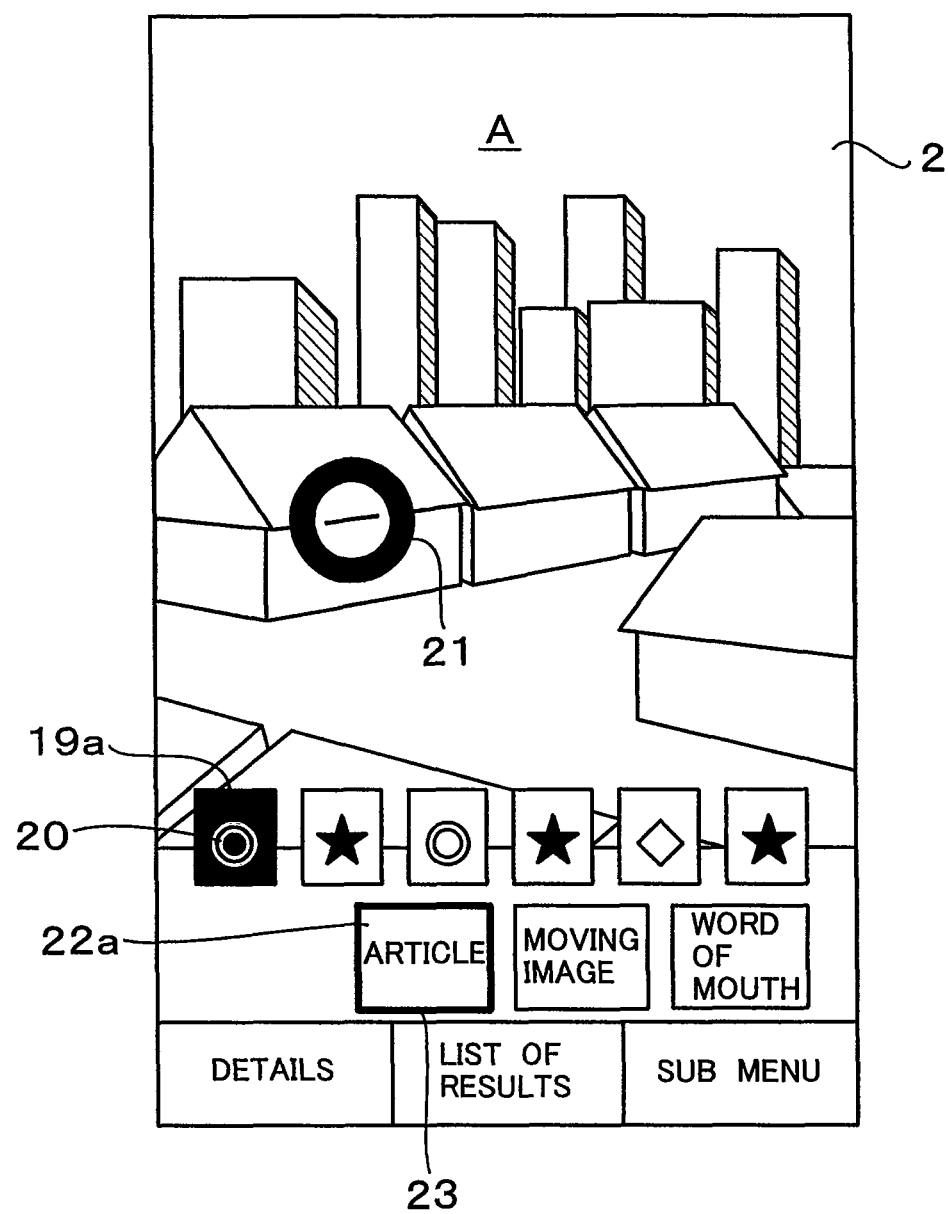
FIGS. 9A to 9D are diagrams showing another detailed example of the retrieval screens displayed on the display screen of the portable information device based on the retrieval result menu of the retrieval service server in FIG. 3.

FIG. 9A shows a state in which an item mark 19a is specified by a cursor 20, i.e., a state similar to the state of FIG. 8D with the detailed information 24 not displayed.

Figure 9B:
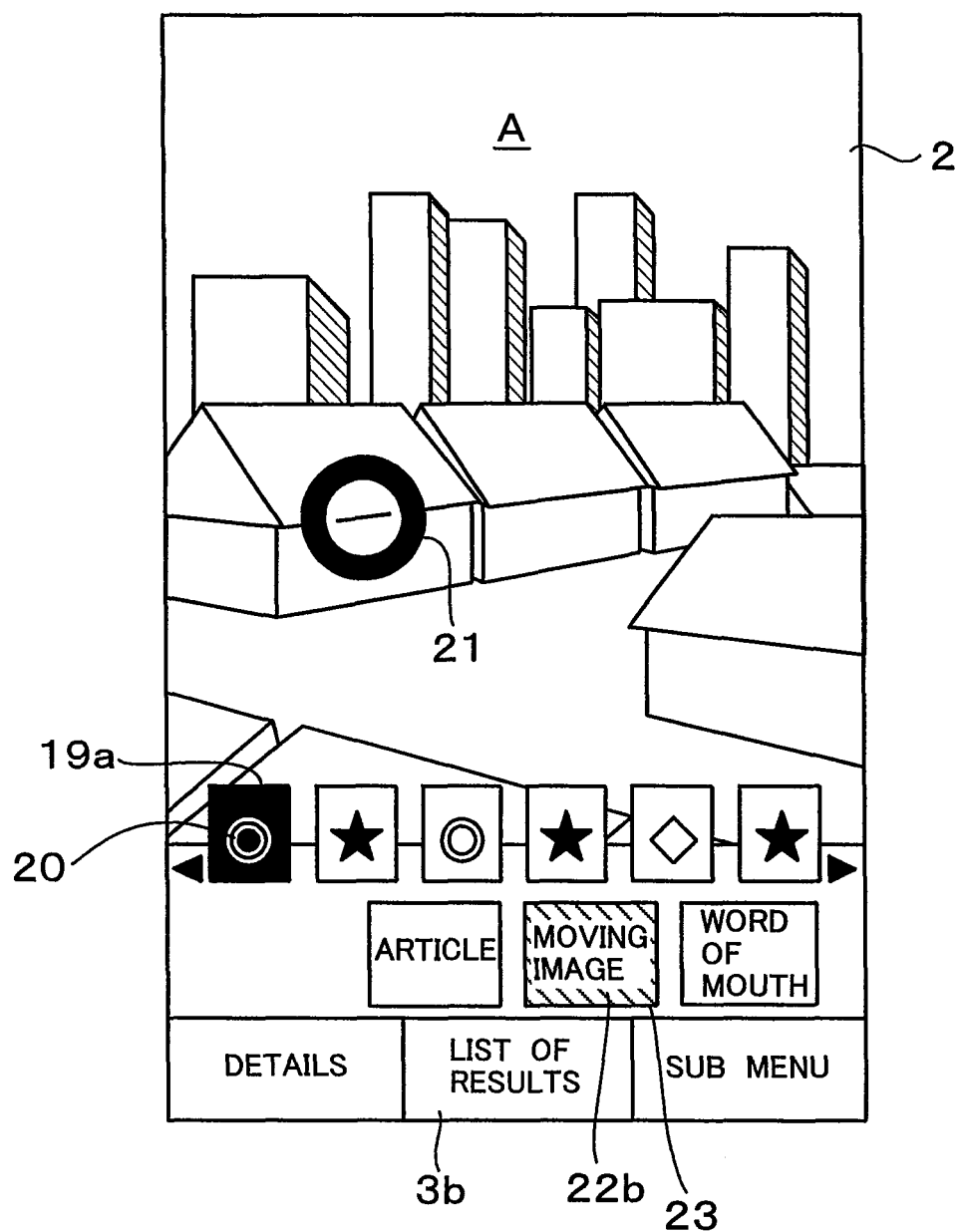

In this display state, when a lower cursor 23 is specified by operating the DOWN key 6D (FIG. 1) and then is moved to a contents type index 22b for "Moving image" by operating the RIGHT key 6R (FIG. 1), a display state shown in FIG. 9B is provided.

Figure 9C:
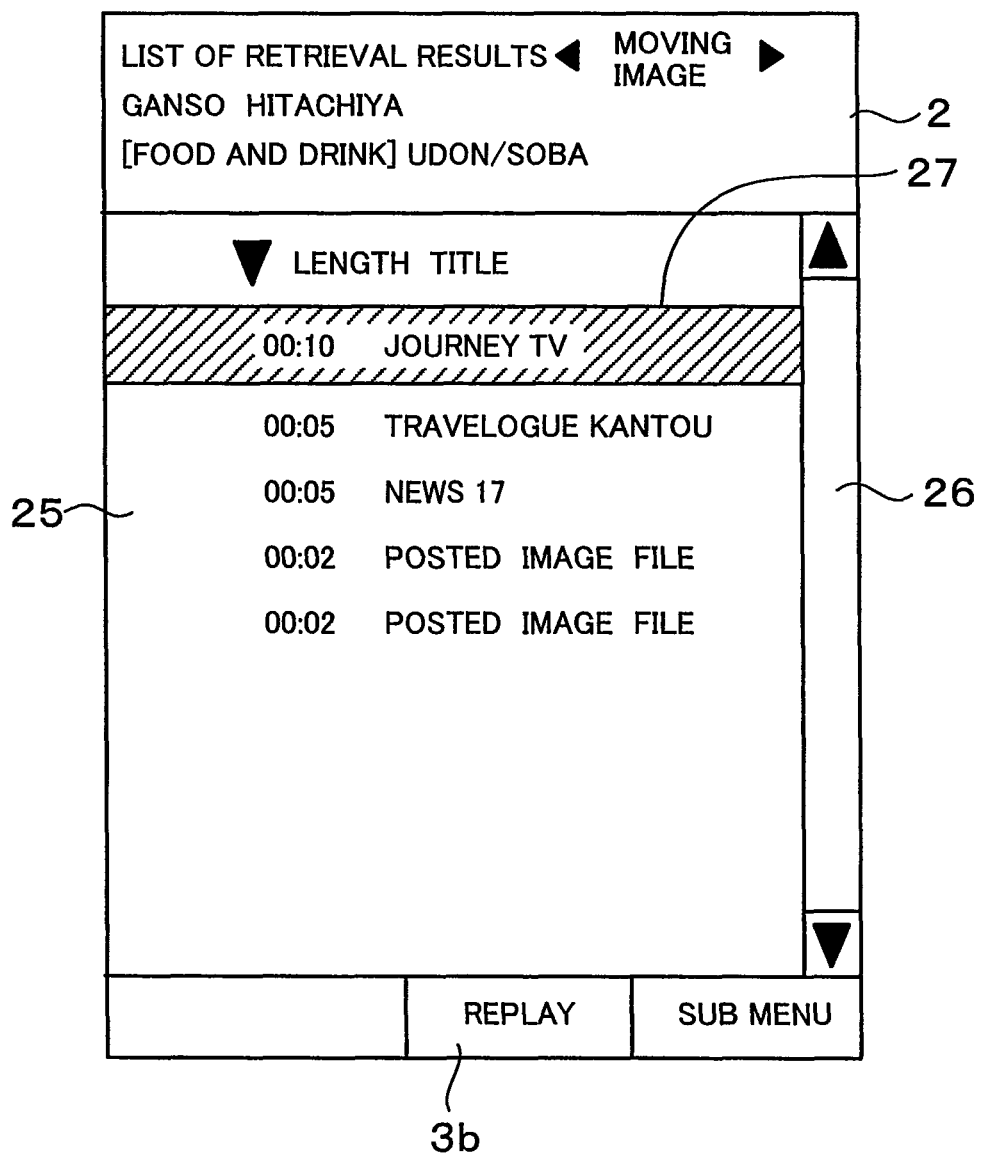

Next, in this state shown in FIG. 9B, when the ENTER key 5 (FIG. 1) provided with "List of results" function on a function screen display area 3b as a "List of Results" function screen is operated, for a target (Ganso Hitachiya) corresponding to the item mark 19a specified by the cursor 20, retrieval related to moving image information thereof is performed on the contents service server 300 (FIG. 3), and as a result of this retrieval, as shown in FIG. 9C, a menu screen 25 with a list arraying titles of moving image contents is displayed, one of which can be specified by the cursor 27. This cursor 27 can be moved up and down by operating the UP key 6U and the DOWN key 6D (FIG. 1) in the operation section 4. Moreover, in a case where all the titles cannot be displayed within the display screen 2, part thereof is displayed and all the titles can be displayed by scrolling the list of titles up and down with the scroll bar 26.

Figure 9D:
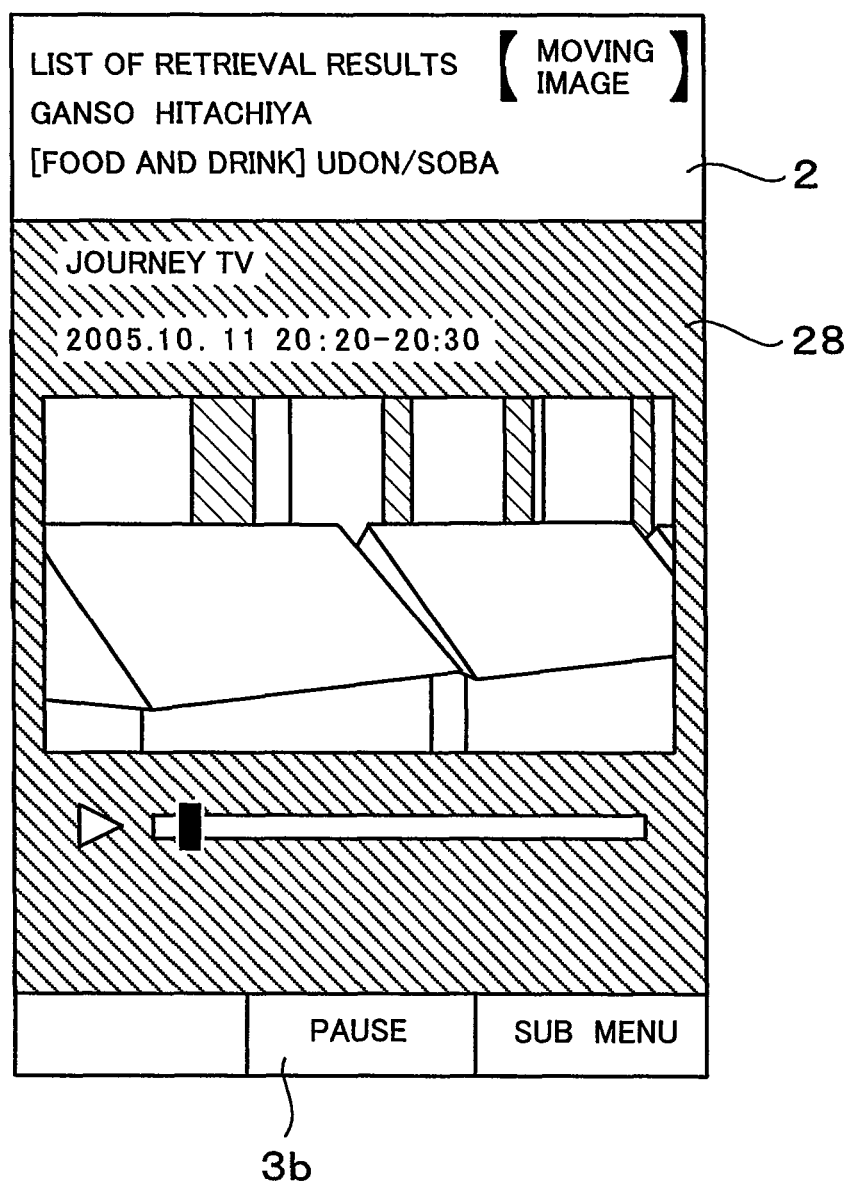

On the display screen 2 where this retrieval menu screen 25 is displayed, on the function screen display area 3b, a "Replay" function screen is displayed and the ENTER key 5 (FIG. 1) is provided with replay function. By operating this ENTER key 5, as shown in FIG. 9D, the moving image contents of the title to be specified can be acquired as retrieval contents 301 from the contents service server 300, and moving image contents 28 thereof are displayed on the display screen 2 as shown in FIG. 9D.

At this point, on the function screen display area 3b, a "Pause" function screen is displayed and the ENTER key 5 (FIG. 1) is provided with pause function. By operating this ENTER key 5, the display state of the moving image contents is paused and returns to the display state shown in FIG. 9C. Then, this pause state continues as long as the cursor 27 is not moved. By operating the ENTER 5 provided with the replay function again, this pause is released and the display of the moving image contents shown in FIG. 9D continues.

In addition, for example, when the "RETURN" key 7c (FIG. 1) is operated in the display state shown in FIG. 9C, the display state returns to the state shown in FIG. 9B.

Figure 10A:
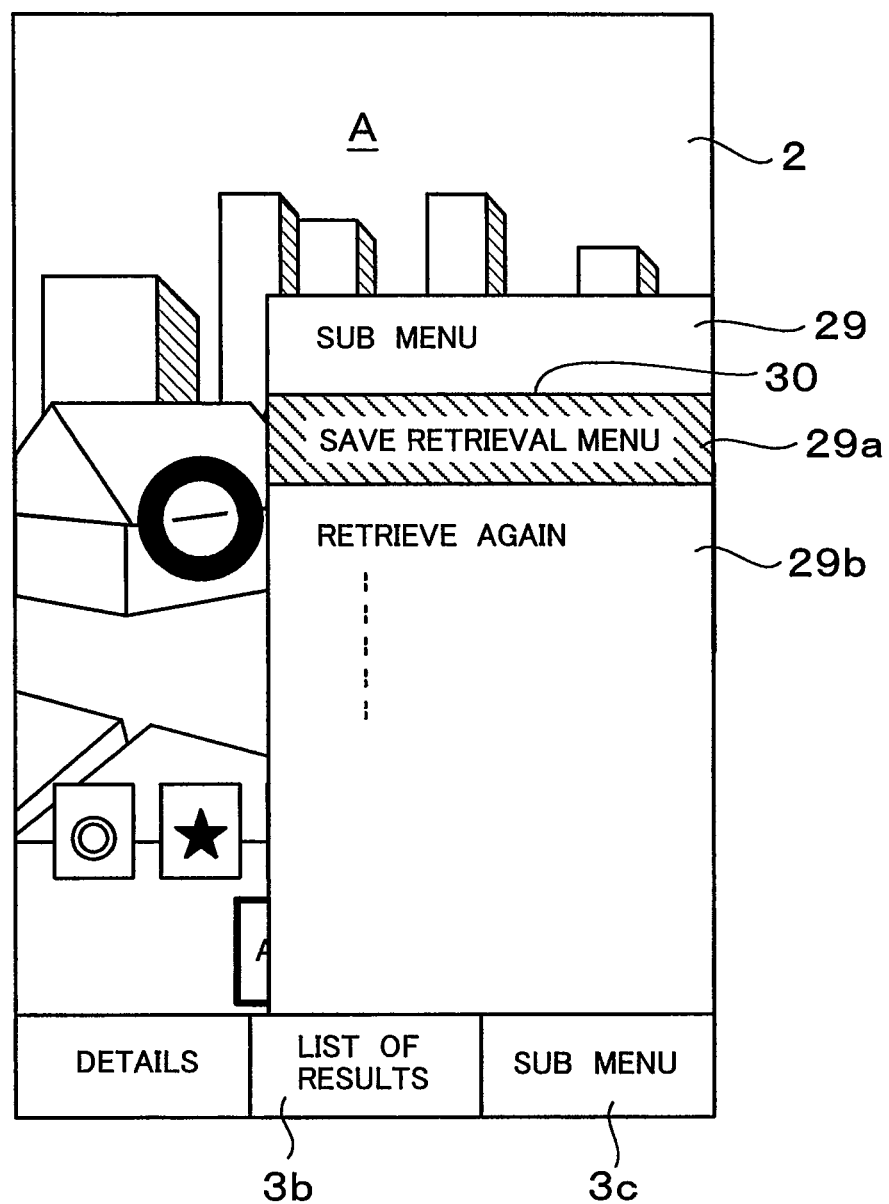
FIGS. 10A to 10C are diagrams showing still another detailed example of the retrieval screens displayed on the display screen of the portable information device based on the retrieval result menu of the retrieval service server in FIG. 3.
Figure 10B:
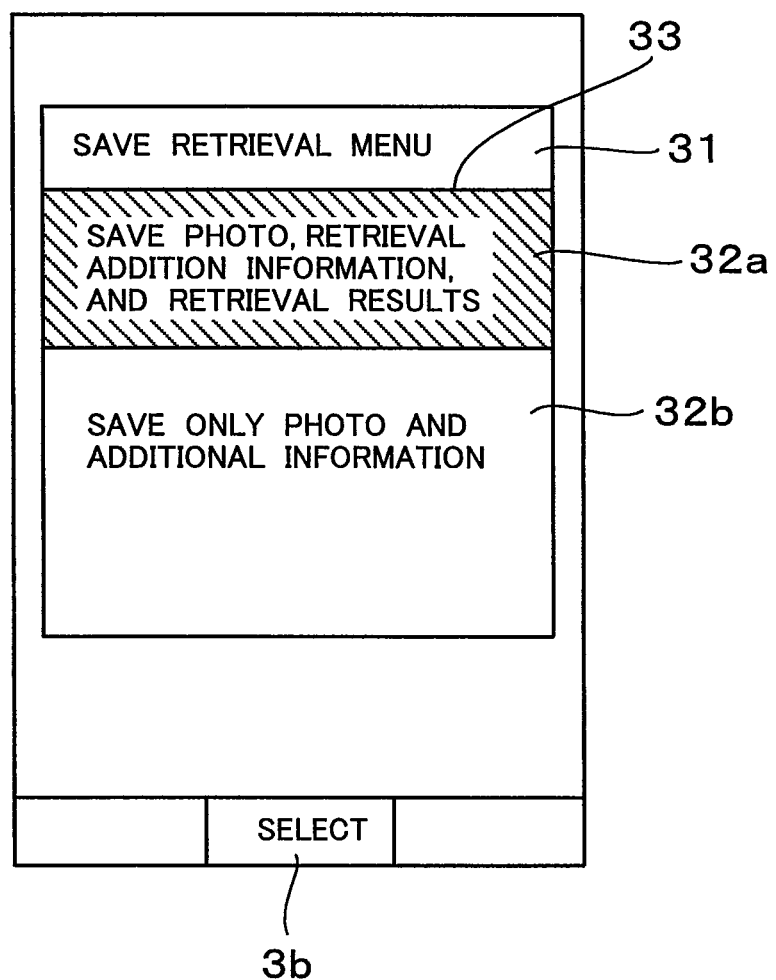
Figure 10C:
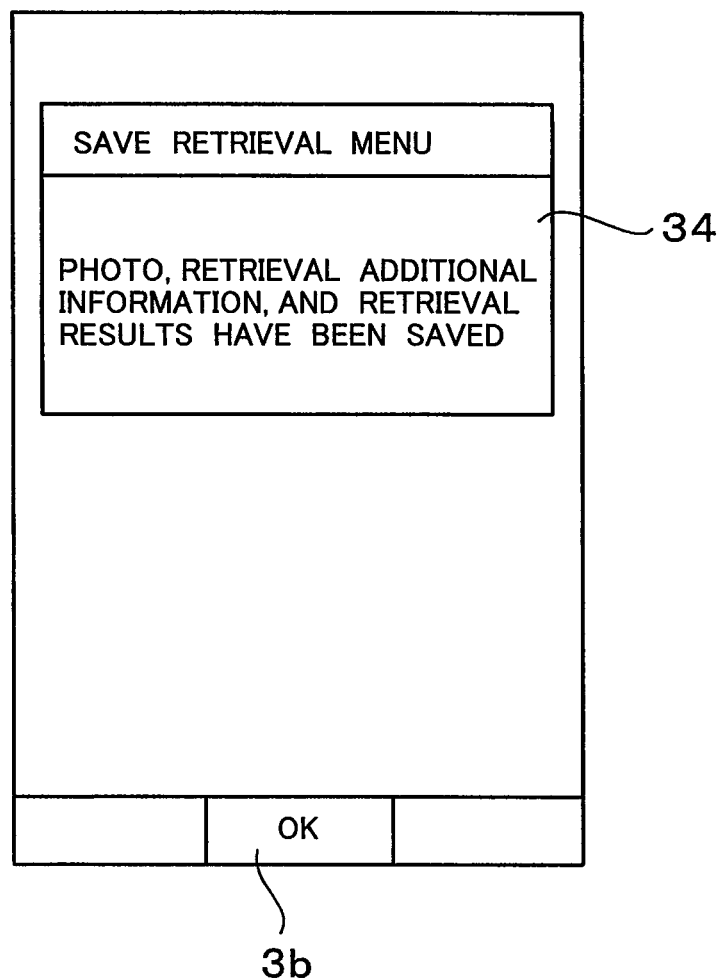

FIGS. 10A to 10C are diagrams showing still another detailed example of the retrieval screens displayed on the display screen 2 of the portable information device 1 based on the retrieval result menu 201 of the retrieval service server. In these figures, numeral 29 denotes a sub menu screen, numerals 29a, 29b, . . . denote sub menus, numeral 30 denotes a cursor, numeral 31 denotes a selection screen, numerals 32a and 32b denote selection items, numeral 33 denotes a cursor, and numeral 34 denotes a message. Portions corresponding to those in FIGS. 8A to 8D and FIGS. 9A to 9D are provided with the same numerals and their overlapping description will be omitted. In 10A to 10C, only necessary portions are provided with numerals for simplified illustration.

Now, in display states on the display screen 2 shown in FIGS. 8A to 8D and FIGS. 9A to 9D, when the operation key 7b (FIG. 1) provided with "Sub menu" function by the function screen display area 3c is operated, the sub menu screen 29 is displayed as shown in FIG. 10A. On this sub menu screen 29, one or more sub menus 29a, 29b, . . . are arrayed and displayed, one of which is specified by the cursor 30, and operating the UP key 6U and the DOWN key 6D permits moving this cursor 30 up and down, thereby specifying an arbitrary sub menu.

Now, under the condition that the sub menu 29a is provided as a "Save retrieval menu" sub menu, the sub menu 29b is provided as a "Retrieve again" sub menu, and so on when the ENTER 5 (FIG. 1) provided with "List of results" function by a function screen display area 3b is operated, the "Save retrieval menu" sub menu specified by the cursor 30 at this point is determined, and the selection screen 31 for saving methods is displayed as shown in FIG. 10B. On this selection screen 31, for example, the selection item 32a for the method of "saving a photo, retrieval additional information, and retrieval results" and the selection item 32b for the method of "saving only a photo and additional information" are displayed, and operating the UP key 6U and the DOWN key 6D (FIG. 1) permits moving the cursor 33 up and down to specify either of the selection items 32a and 32b, and operating the ENTER key 5 provided with selection function by displaying a "Selection" function screen on the function screen display area 3b permits selecting and executing either of these selection items 32a and 32b specified by the cursor 33.

Now, when the selection item 32a is specified and then selected by operating the ENTER key 5, the saving method of this selection item is executed, whereby the photo (that is, the camera image A described above), the additional information B, and the retrieval information from the retrieval service server 200 shown in FIGS. 7C and 7D are stored and saved into the storage section 11 (FIG. 2). Then upon end of this saving processing, the message 34, as shown in FIG. 10C, is displayed which notifies that the saving processing has ended. At this point, on the function screen display area 3b, an "OK" function screen is displayed, and operating the ENTER 5 (FIG. 1) provided with this function causes the display state to return to the state before the sub menu screen 29 shown in FIG. 10A is displayed.

In FIG. 10A, when the "Retrieve again" sub menu 29b is specified by the cursor 30 and the ENTER key 5 (FIG. 1) is operated, a list of camera images A (photos), not shown, stored and saved in the storage section 11 (FIG. 2) is read out and displayed. By selecting any of these, if the retrieval result 201 in the retrieval service server 200 for this selected camera image A is saved in the storage section 11, this is read out from the storage section 11 and displayed, for example, as shown in FIG. 8A. If the retrieval result 201 is not stored in the storage section 11, this camera image A and the additional information B from the storage section 11 are transmitted to the retrieval service server 200 for retrieval as described above, and, by using the retrieval result 201 thereof, for example, a display as shown in FIG. 8A is provided. Consequently, retrieval can be conducted again by using the camera image A or the like once used for retrieval.

Further, the sub menu screen 29 shown in FIG. 10A includes a "Transmit" sub menu and the like, although not shown. Use of such a sub menu permits the camera image A, the additional information B, and further, the results of retrieval to be combined together and transmitted to another portable information device or the like, and also permits them to be acquired from another portable information device or the like. This portable information device or the like can, based on information acquired in this manner, perform the aforementioned retrieval in the retrieval service server 200 and the aforementioned contents retrieval in the contents service server 300 as described above.

Figure 11:
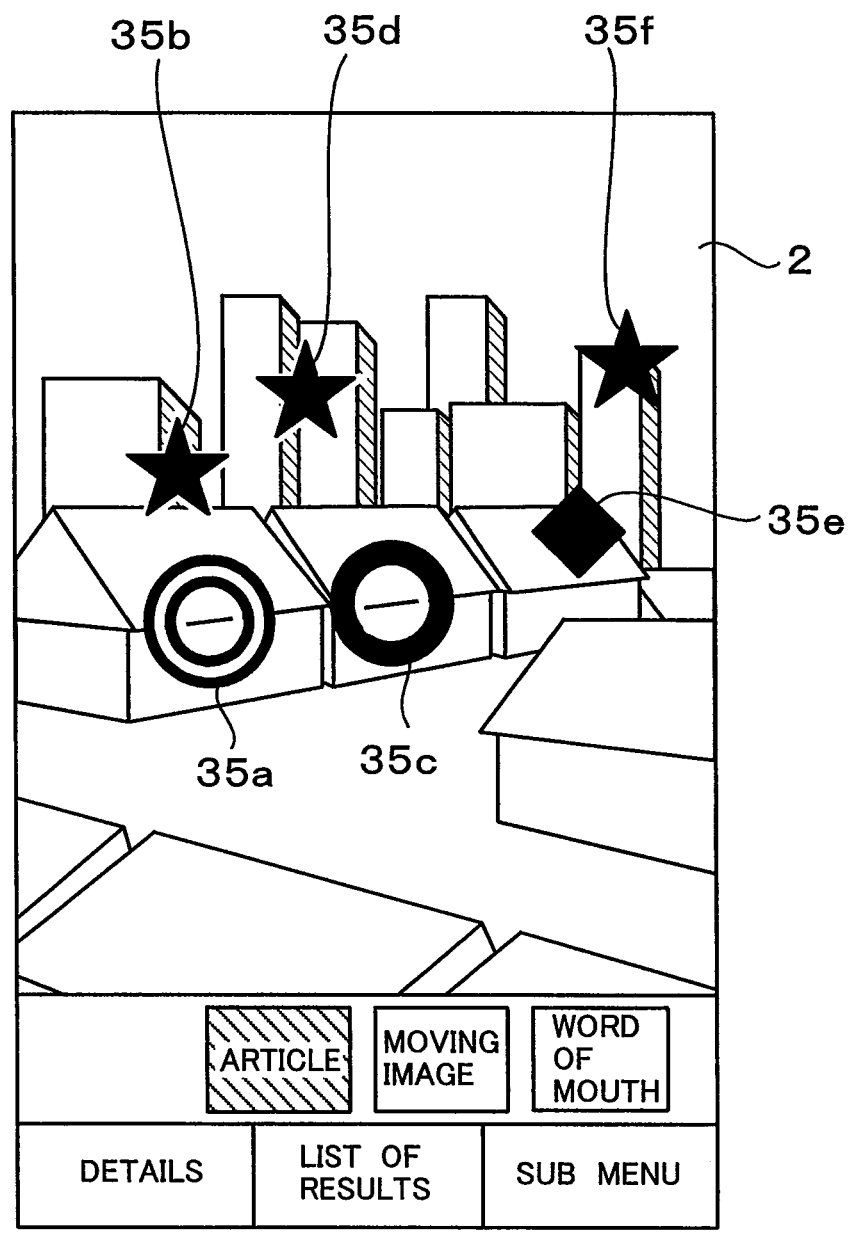
FIG. 11 is a diagram showing still another detailed example of the retrieval screens displayed on the display screen of the portable information device based on the retrieval result menu of the retrieval service server in FIG. 3.

FIG. 11 is a diagram showing still another detailed example of the retrieval screens displayed on the display screen 2 of the portable information device 1 based on the retrieval result menu 201 of the retrieval service server. In this figure, numerals 35a to 35f denote item marks. Portions corresponding to those in FIGS. 8A to 8D and FIGS. 9A to 9D are provided with the same numerals and their overlapping description will be omitted. In FIG. 11, only necessary portions are provided with numerals for simplified illustration.

In the same figure, this detailed example displays the item marks 35a to 35f at display positions of corresponding targets on the camera image A. These item marks 35a to 35f are provided with the same function as those of the item marks 19a to 19f shown in FIGS. 8A to 8D and FIGS. 9A to 9D described above, and also provided with function as target marks indicating target positions.

Specification of these item marks 35a to 35f is performed by operating the UP key 6U and the DOWN key 6D. A cursor involved in performing this specification is colored with a specific color. That is, the item mark specified by this cursor is displayed in a color different from those of the item marks not specified.

For other aspects, the same description as that provided in FIGS. 8A to 8D and FIGS. 10A to 10C applies.

What is claimed is:

1. In an information retrieval system with a camera-fitted information device in use,
the camera-fitted information device comprising:
a first means for detecting a current position;
a second means for detecting an orientation;
a third means for transmitting to a server a camera image photographed by the camera of the camera-fitted information device and additional information including position information detected by the first means, orientation information detected by the second means, lens focal length information and photographing magnification information of the camera and then requesting for retrieval of at least one target within a photographing range of the camera image; and
a fourth means for receiving from the server a retrieval result related to a target within the photographing range of the camera detected based on the additional information and a target detected based on information in the camera image along with coordinates information indicating a position of the target in the camera image,
wherein the server, in response to the requested retrieval of the at least one target within the photographing range of the camera image, retrieves retrieval items of the at least one target within the photographing range of the camera of the camera-fitted information device detected based on the additional information and the target detected based on information in the camera image with reference to retrieval target database of the server, and upon the retrieval, preliminarily classifies the photographing range of the camera into plural regions in accordance with a distance from the current position of the camera-fitted information device so as to retrieve various types of items set for the respective regions such that the retrieval items are different in each of the classified regions, and transmits the retrieved items as the retrieval result to the camera-fitted information device, and
wherein the photographing range of the camera is preliminarily classified into at least a first within-close-distance region, a second within-intermediate-distance region, and a third long-distance region, wherein the first within-close-distance region is retrieved for a first type of the target item and the first and second regions are retrieved for a second type of the target items while the first, second and third regions are retrieved for a third type of the target items, wherein the server transmits the retrieved items as the retrieval result to the camera-fitted information device, and wherein the camera-fitted information device based on the received retrieval result causes a retrieval screen for each of the at least one target along with the camera image to be displayed on a display screen of a display section and a target mark to be displayed on the position of the corresponding target in the camera image based on the coordinates information.

2. The information retrieval system with a camera-fitted information device according to claim 1, wherein based on the retrieval results of the server, contents type indexes indicating contents types of the target corresponding to the selected selection information are arrayed and displayed, and any of the contents type indexes is selected, allowing retrieval of contents of the type corresponding to the selected contents type index.

3. The information retrieval system with a camera-fitted information device according to claim 1, wherein storage is provided which stores and saves the camera image and the additional information, or the camera image, the additional information, and the retrieval results provided by the server.

4. The information retrieval system with a camera-fitted information device according to claim 3, wherein the retrieval on the server can be performed by using the camera image and the additional information saved in the storage.

5. The information retrieval system with a camera-fitted information device according to claim 3, wherein means for transmitting the camera image and the additional information saved in the storage to another information retrieval system is provided.

6. The information retrieval system with a camera-fitted information device according to claim 1, wherein designation information of a priority range indicating the range prioritized for retrieval is added to the camera image, and the retrieval items list is made up with 'priority' information added on the items of the target in the priority range.

7. A method of retrieving information by retrieval service server by which a camera image together with additional information on the camera image are received from a camera-fitted information device coupled via a communication line, the method comprising the steps of:

receiving position information and orientation information as well as lens focal length information and photographing magnification information of the camera-fitted information device as the additional information;

in accordance with a request by the camera-fitted information device to retrieve information on a target within a photographing range of the camera image, retrieving retrieval items of the target within the photographing range of the camera of the camera-fitted information device detected based on the additional information and the target detected based on information in the camera image with reference to retrieval target database of the retrieval server;

upon the retrieval, preliminarily classifying the photographing range of the camera into plural regions in accordance with a distance from the current position of the camera-fitted information device so as to retrieve various types of items set for the respective regions such that the retrieval items are different in each of the classified regions;

preliminarily classifying the photographing range of the camera into at least a first within-close-distance region, a second within-intermediate-distance region and a third long-distance region;

retrieving the first within-close-distance region for a first type of the target item and retrieving the first and second regions for a second type of the target items while retrieving the first, second and third regions for a third type of the target items; and sending back the retrieved items as the retrieval result to the camera-fitted information device.

8. The method of retrieving information by retrieval service server according to claim 7, wherein designation information of a priority range indicating the range prioritized for retrieval is added to the camera image, and wherein the retrieval items list is made up with 'priority' information added on the items of the target in the priority range.

* * * * *